United States Patent [19]

Oda et al.

[11] Patent Number: 5,087,976
[45] Date of Patent: Feb. 11, 1992

[54] AUTOMATIC ADJUSTMENT APPARATUS FOR INDEPENDENTLY ADJUSTING DIFFERENT REGIONS OF A PICTURE RASTER

[75] Inventors: Osamu Oda, Saitama; Toshio Amano, Kanagawa, both of Japan

[73] Assignee: Sony Corporation, Tokyo, Japan

[21] Appl. No.: 607,284

[22] Filed: Oct. 31, 1990

[30] Foreign Application Priority Data

Nov. 10, 1989 [JP] Japan .................................. 1-293588

[51] Int. Cl.$^5$ ............................................. H04N 5/262
[52] U.S. Cl. ..................................... 358/183; 358/168; 358/169; 358/174; 358/22 PIP
[58] Field of Search ................... 358/188, 191.1, 193.1, 358/194.1, 168, 169, 166, 169, 166, 174, 164, 27, 22 PIP, 183

[56] References Cited

U.S. PATENT DOCUMENTS

| | | | |
|---|---|---|---|
| 4,356,508 | 10/1982 | Okada | 358/168 |
| 4,489,349 | 12/1984 | Okada | 358/164 |
| 4,554,532 | 11/1985 | Ise | 358/174 |
| 4,605,968 | 8/1986 | Hayashi | 358/188 |
| 4,628,362 | 12/1986 | Waehner | 358/168 |
| 4,799,106 | 1/1989 | Moore | 358/164 |
| 4,905,077 | 2/1990 | Ishii | 358/22 PIP |

Primary Examiner—James J. Groody
Assistant Examiner—Sherrie Hsia
Attorney, Agent, or Firm—Hill, Van Santen, Steadman & Simpson

[57] ABSTRACT

An automatic picture adjustment apparatus in which input video signals are subjected to level conversion for picture quality adjustment within a time period which is shorter than one vertical synchronization period so that the picture quality adjustment of predetermined different portions of the raster may be independently corrected.

3 Claims, 3 Drawing Sheets

AUTOMATIC ADJUSTMENT APPARATUS FOR INDEPENDENTLY ADJUSTING DIFFERENT REGIONS OF A PICTURE RASTER

BACKGROUND OF THE INVENTION

1. Field of the Invention

This invention relates to an automatic picture quality adjustment apparatus for use in a television receiver or the like. More particularly, it relates to an apparatus in which input video signals are subjected to the operation of level conversion for adjustment of the picture quality, in a manner such that the picture quality of an image on a screen surface or raster, such as brightness, contrast, color saturation or color hue, may be automatically adjusted.

2. Description of Related Art

In general, in a video signal processing system of a television receiver or a monitor receiver, the picture quality adjustment apparatus for adjusting the picture quality, such as the luminosity or the brightness, the contrast, the color saturation or the color hue, is used to obtain the correct picture quality or a picture quality which is suited to the desires of the individual users.

With such picture adjustment apparatus, the input video signals are subjected to a level conversion operation for picture quality adjustment, such as by changing the amplification factor or the phase of the luminance component and/or color components of the input video signals, so as to adjust the picture quality, such as brightness or contrast. Heretofore, the parameters used for the operation of conversion for such picture quality adjustment are manually set with a setting switch, or are set to a standard value which is preset at the factory, by an automatic switch, such that the picture quality of the entire screen surface or raster is adjusted uniformly by the thus set parameters.

With the above described conventional picture quality adjustment apparatus, the picture quality is uniformly adjusted over the entire screen surface or raster. Thus, although it is possible with the conventional picture quality adjustment apparatus to realize a balanced adjustment of the entire picture quality of the screen surface or raster a proper picture quality is not realized in this case as for the picture quality of detail areas of the screen surface or raster.

For example, if an unusually white-tinted small region exists on the screen surface, such as a telop of a title, for example, which is superimposed in white in a zone of the screen surface, the white-tinted region will be over pronounced in contrast, if a proper contrast is obtained in the remaining regions, with the result that the title or the like may occasionally be barely legible. Conversely, if the contrast of the white-tinted region is weakened so as to render the title more legible, the contrast of the remaining regions of the picture surface are also weakened, with the result that the image displayed on the screen is poor.

On the other hand, a so-called two-image television system has been developed, in which a subsidiary image is superimposed on the main image and which uses digital signal processing of the video signals. However, if the conventional picture quality adjustment apparatus is used in the two-image television system, since both the main image and the subsidiary image will be subjected to the same picture quality adjustment operation, when the main image is light and the subsidiary image is rather dark, and if the lightness level is lowered to obtain the desired level of lightness for the main image, the subsidiary image will be too dark and hence it is not possible to obtain a proper picture quality for the subsidiary image.

OBJECT AND SUMMARY OF THE INVENTION

It is therefore an object of the present invention to provide an automatic picture quality adjustment apparatus wherein the picture quality of different portions of the screen surface may be independently adjusted according to the contents of the input video signals.

It is another object of the present invention to provide an automatic picture quality adjustment apparatus in which the operation of level conversion may be performed on the input video signals within a time period which is shorter than one vertical synchronization period.

It is a further object of the present invention to provide an automatic picture quality adjustment apparatus in which picture quality adjustment may be performed using digital signal processing.

It is a further object of the present invention to provide a television receiver in which the picture quality of individual portions of the picture surface may be independently adjusted depending upon the contents of the input video signals.

It is yet another object of the present invention to provide a television receiver in which the picture of a main image and of a subsidiary image may be independently adjusted.

These and other objects, advantages and features of the present invention will become more apparent upon reading the following description especially in conjunction with the accompanying drawings.

Briefly, the present invention resides in an automatic picture adjustment apparatus comprising a level converter for performing an operation of level conversion on input video signals for automatically adjusting the picture quality, and includes a level detector for detecting the levels of the input video signals, and a controller for controlling the level converter with an output signal from said level detector.

In another aspect, the present invention relates to a television receiver which has an automatic picture adjustment function, and the television receiver having an automatic picture adjustment apparatus including a level converter for performing the operation of level conversion on input video signals for adjusting the picture quality, a level detector for detecting the level of the input video signals, and a controller for controlling the level converter with the output signal of the level detector, a tuner for receiving RF signals and converting the received RF signals into intermediate frequency signals, an intermediate frequency circuit for processing the intermediate frequency signals, and a display device for displaying an image.

With the automatic picture quality adjustment apparatus of the present invention, the signal level of the input video signals is detected with a level detection means and a control signal is formed in a controller as a function of the results of detection. The level converter is controlled by the control signal within a time period which is shorter than one vertical synchronization period so that the operation of level conversion for picture quality adjustment is performed on the input video signals within a time period shorter than one vertical synchronization period.

Thus, it is possible with the automatic picture quality adjustment apparatus of the present invention to make separate picture quality adjustments of different portions of the screen surface corresponding to the time period which is shorter than one vertical synchronization period. Hence, for example, in a two-image television apparatus, satisfactory picture quality adjustment may be performed on a subsidiary picture as a function of the image contents of the subsidiary picture.

If the screen surface be divided into a plurality of regions, and if the picture quality adjustment is performed separately for each of these regions, these regions of the screen may be separately adjusted to obtain optimum picture quality. Therefore, satisfactory picture quality may be realized even in cases where the image contents on the screen are considerably different or wherein the telop of a title, for example, is expressed with a white tint in superimposition on the main image which is displayed on the screen.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

The drawings show an embodiment of an automatic picture quality adjustment apparatus which has a video signal processing system for a television receiver, according to the present invention.

Figure 1:
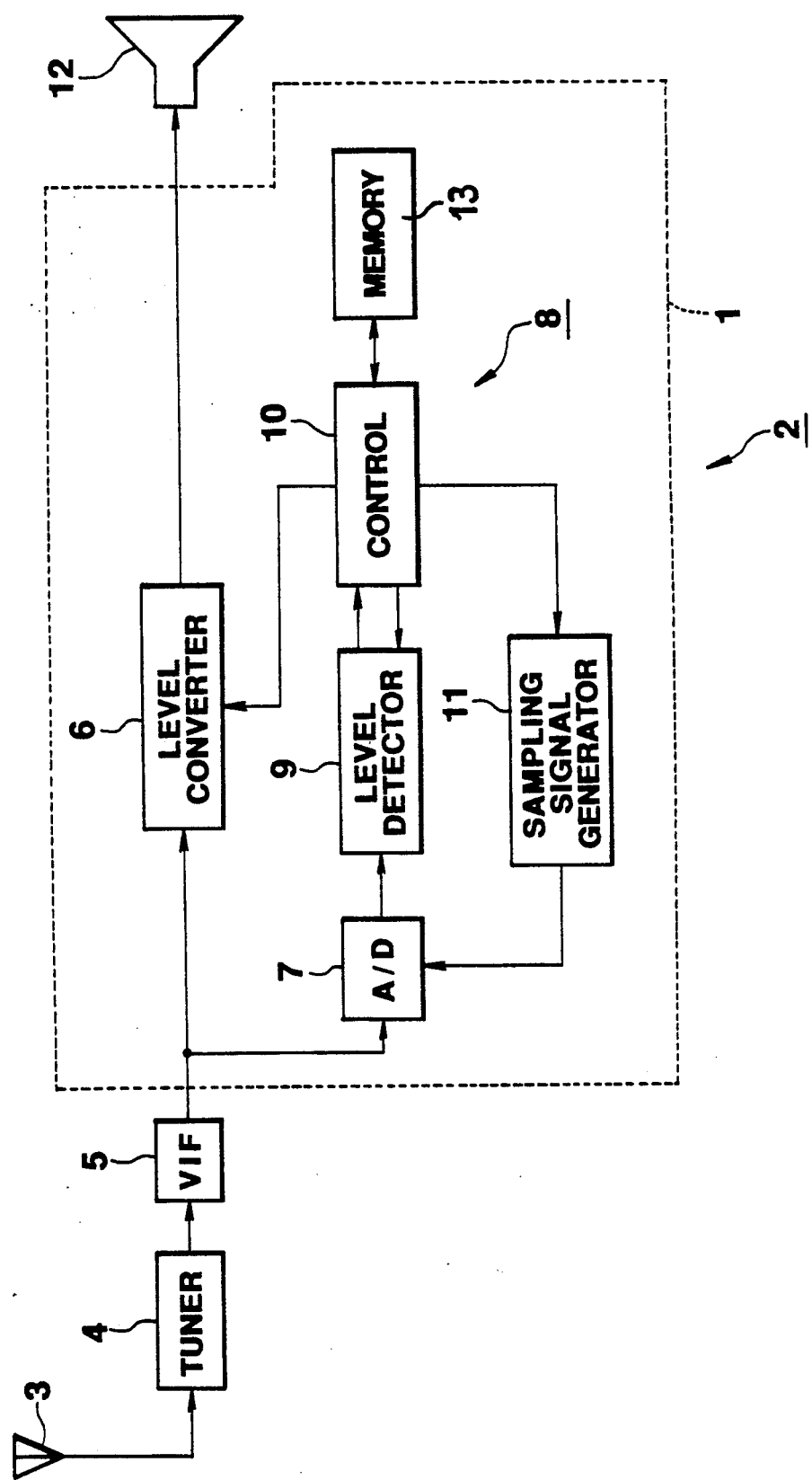
FIG. 1 is a block diagram showing an embodiment of the automatic picture quality adjustment apparatus according to the present invention, as applied to a television receiver.

FIG. 1 is a block diagram showing an automatic picture quality adjustment apparatus 1 of the illustrative embodiment of the present invention.

A tuned output from a tuner 4 which is connected to an antenna 3 of a television receiver 2 is subjected to video intermediate frequency amplification and video detection in a video intermediate frequency circuit 5 and thereby converted into video signals. Such video signals are supplied to the automatic picture quality adjustment apparatus 1 as input video signals.

Figure 2:
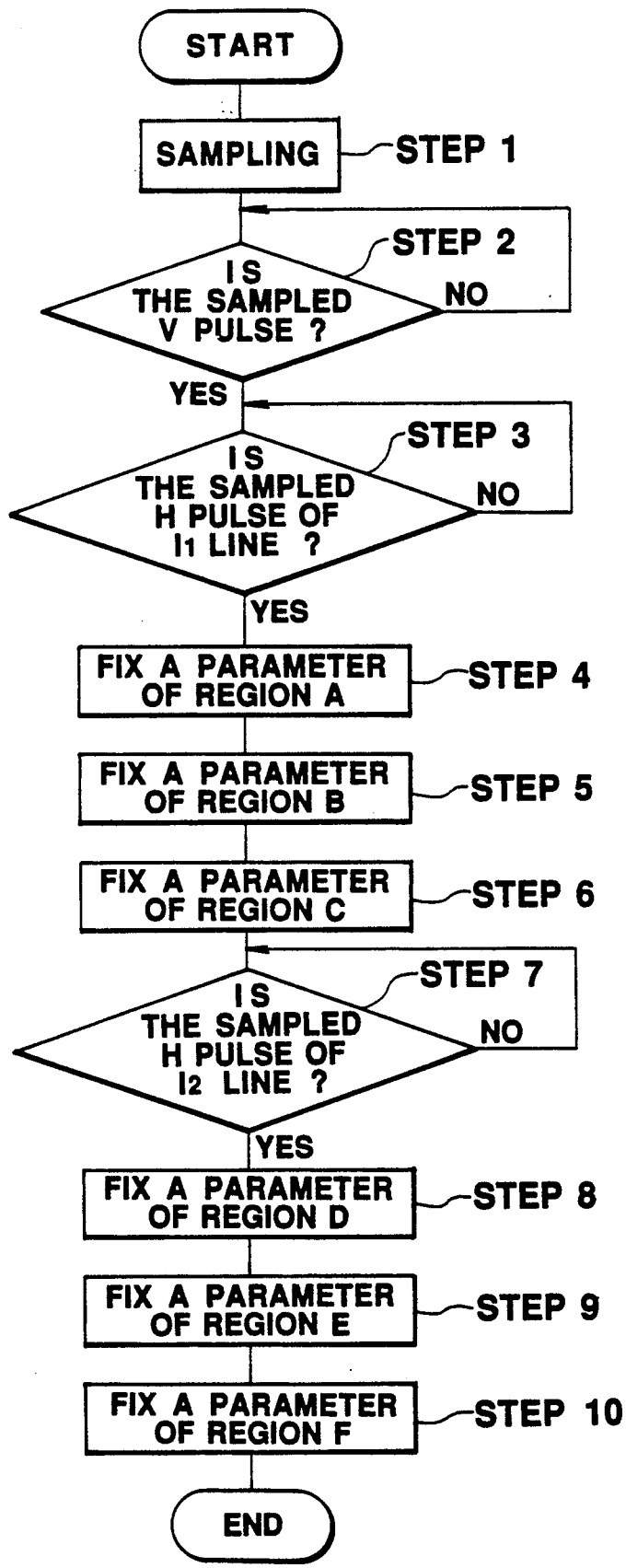
FIG. 2 is a flow chart showing the operation of a micro-computer employed in the automatic picture quality adjustment apparatus according to the present invention.

The automatic picture quality adjustment apparatus 1 is formed of a level converter 6, an analog-to-digital (A/D) converter 7 and a micro-computer 8. In the level converter 6, the input video signals from the video intermediate frequency circuit 5 are subjected to level conversion for adjusting the brightness of the image, the contrast, and the color saturation or color hue, before being transmitted to a picture tube 12. The duration of the operation of level conversion at the level converter 6 is controlled so that it is shorter than one vertical synchronization period by control signals which are generated in the micro-computer 8 to which the input video signals from the video intermediate frquency circuit 5 are transmitted through the A/D converter 7. The micro-computer 8, which controls the operation of conversion, is represented by functional blocks of a level detector means 9, a control means 10 and a sampling signal generating means 11 connected as shown, and performs a control operation as indicated by the flow chart shown in FIG. 2.

When the program is started, the micro-computer 8 performs an operation at step 1 when it receives one frame, for example, of input video signals from the video intermediate frequency circuit 5, which are uniformly sampled over the screen, into the level detection means 9. The sampled input video signals have been obtained at the A/D converter 7 with the aid of the sampling signals which are transmitted from the sampling signal generating means 11. The signal levels of the sampled video signals or data, thus obtained by the level detection means 9, are detected for analyzing the picture quality of the input video signals. The results of detection of the one-frame sampled data are stored in a memory 13.

Based on the stored signal level data in the memory 13, the control operation is performed in the following order.

At step 2, the control waits at the NO loop until detection of a vertical synchronization (V) pulse which indicates the start of the next frame. When the V pulse is detected (YES), control proceeds to next step 3.

Figure 3:
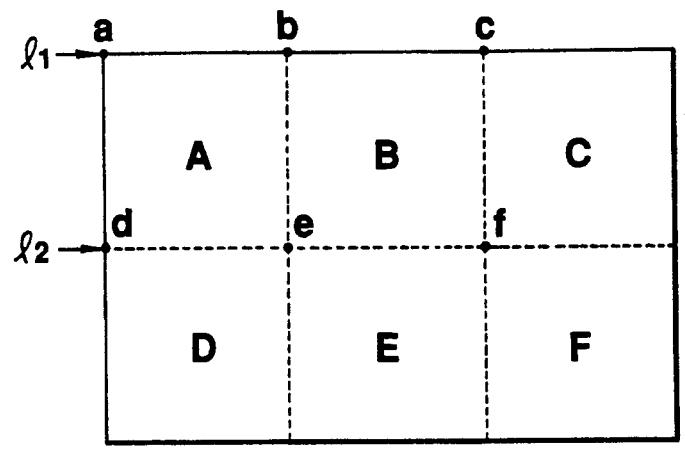
FIG. 3 is a diagrammatic view showing various screen regions which are to have their picture qualities adjusted by the automatic picture quality adjustment apparatus of the present invention.

At step 3, control waits at the NO loop until detection of a horizontal synchronization (H) pulse which indicates the start of a line $l_1$ at the upper end of the screen shown in FIG. 3. When the H pulse for the line $l_1$ is detected (YES), control proceeds to next step 4.

At step 4, in advance of reaching a start position a of an upper left region A of the raster shown in FIG. 3, that portion of the signal level data of the input video signals stored in the memory at step 1 which corresponds to the region A is read, and parameters for the operation of conversion for picture quality adjustment at the level converter 6 are established, as a function of the thus detected signal levels, for optimizing the picture quality of the region A. During the period of scanning the region A, control signals are produced by the control means 10 for controlling the level converter 6 so that the level converter 6 will perform the operation of conversion on the basis of these parameters.

At step 5, before reaching a start position b of a region B following the region A, parameters for the operation of conversion are similarly established in accordance with the signal levels for this region B, and the level converter 6 is controlled by control signals of the control means 10 so that, during the period of scanning the region B, the operation of conversion will be performed on the basis of these parameters.

At step 6, before reaching a start position c of an upper right region C or the raster following the region B, parameters for the operation of conversion are similarly established in accordance with the signal levels for this region B, and the level converter 6 is controlled by control signals of the control means 10 so that, during the period of scanning the region C, the operation of conversion will be performed on the basis of these parameters.

At step 7, control waits at the NO loop until detection of a horizontal synchronization (H) pulse which indicates the start of a line $l_2$ lying below the regions A, B and C and at the horizontal centerline of the raster shown in FIG. 3. When the H pulse for this line $l_2$ is detected (YES), control proceeds to the next step 8.

At step 8, as at step 4, before reaching a start position d of a region D at the lower left side of the raster shown in FIG. 3, that portion of the signal level data of the input video signals stored in the memory at step 1 which corresponds to the region A is read, and parameters for the operation of conversion for picture quality adjustment at the level converter 6 are established, as a function of the thus detected signal level, for optimizing the picture quality of the region D. During the period of scanning the region D, control signals are produced by the control means 10 for controlling the level converter 6 so that the level converter 6 will perform the operation of conversion on the basis of these parameters.

Similarly, at the subsequent steps 9 and 10, before reaching start positions e and f of the regions E and F following the above region D, parameters for the operation of conversion are established in accordance with the signal levels of these regions E and F, and the level converter 6 is controlled by control signals from the control means 10 so that, during the period of scanning these regions E and F, the operation of conversion will be performed on the basis of these parameters.

After establishing, by steps 1 to 10, the parameters for the operation of conversion for the six regions A, B, C, D, E and F which entirely form the raster, the operation is repeated from the step 1 so as to sequentially update the parameters for the conversion so as to follow changes in the image contents of the screen surface or raster which occur.

Thus, by controlling the parameters for the operation of conversion for each of the regions A to F within a time interval shorter than one vertical synchronization period corresponding to the scanning of one complete raster, the control means 10 independently adjusts the picture quality of the regions A to F.

In this manner, video signals in which the picture quality has been independently adjusted according to the image contents of the regions A to F included in one vertical synchronization period which can be obtained from the level converter 6.

Figure 4:
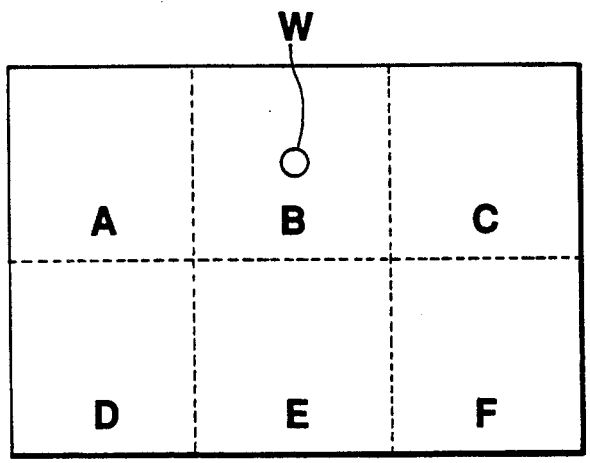
FIG. 4 is a diagrammatic view showing various screen regions for illustrating the operation of the automatic picture quality adjustment apparatus of the present invention.

Thus, should an extremely white region W exist in a portion of a raster, as shown, for example, in FIG. 4, not only the contrast of the region B including such region W, but also the contrast of the remaining regions A, C, D, E and F, are optimized according to the respective image contents, so that a satisfactory picture quality will be realized over the entire raster. Similarly, in case a raster has a telop such as a title superimposed in white, an image extremely comfortable to view may be obtained, since the picture quality of the raster portion including the title will be independently adjusted from the remaining raster portions.

Although the raster is divided into six regions in the present embodiment for separate or independent adjustment of the picture quality, it is preferred that the micro-computer 8 be designed so as to handle more than six regions so as to enable more intensive adjustments of the picture quality.

Figure 5:
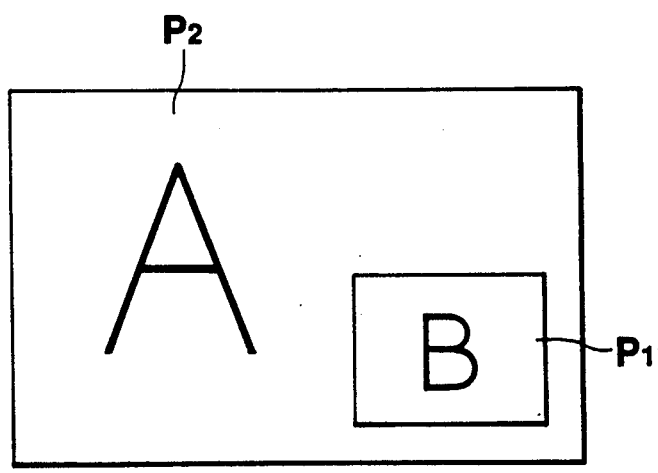
FIG. 5 is a diagrammatic view showing a subsidiary image superimposed on a main image in a two-image television system or apparatus.

Although the picture quality adjustment for the entire raster is performed in the above embodiment by synthesizing a control for a time period which is shorter than one vertical synchronization period, it is possible to separately adjust the picture quality of a portion only of the raster. For example, in the case of a synthesized raster which is formed by a two-raster television system, as shown in FIG. 5, the picture quality of a raster portion which corresponds to a subsidiary image or raster $P_1$ may be independently adjusted during a time period which is shorter than one vertical synchronization period, than the picture quality adjustment of main image or raster $P_2$, so as to enable the subsidiary raster $P_1$ to be viewed more comfortably as a function of its image contents.

Although the invention has been described with respect to preferred embodiments, it is not to be so limited as changes and modifications can be made which are within the full intended scope of the invention as defined by the appended claims.

We claim as our invention:

1. An automatic picture adjustment apparatus comprising, a level converter for performing level conversion on input video signals for adjusting the picture quality of a displayed image; a level detector receiving and detecting the level of said input video signals, a controller which controls said level converter and receiving the output signal of said level detector, wherein said controller controls said level detector within a predetermined time period shorter than one vertical synchronization period, further comprising a sampling signal generator which generates sampling signals for determining individual sampled video signals which respectively correspond to different regions of a picture raster, and an A/D converter controlled by said sampling signal generator and converting the input video signals into corresponding digital signals, wherein said controller is formed of a micro-computer circuit, wherein said micro-computer circuit establishes individual parameters for each of said different regions of said picture raster, and wherein said level converter is controlled such that said different regions of a picture raster are individually adjusted.

2. A television receiver having an automatic picture adjustment function, said television receiver comprising, an automatic picture adjustment apparatus, a tuner which receives RF signals and converts them into intermediate frequency signals, an intermediate frequency circuit receiving and processing said intermediate frequency signals and supplying them to said automatic picture adjustment apparatus, and a display device for displaying an image receiving the output of said automatic picture adjustment apparatus, and wherein said automatic picture adjustment apparatus independently controls each different regions of said picture raster.

3. A television receiver comprising, a tuner which receives incoming signals and passes a selected signal, a level converter which receives the output of said tuner, a video presentation means with a picture area which receives and displays the output of said level converter, an automatic picture quality adjustment circuit receiving an output of said tuner and supplying an output to control said level converter to modify its output to said presentation means so that signals displayed on different regions of said picture area are differently amplified so that each region can be independently corrected and the complete picture area is made up of said different regions, wherein said automatic picture quality adjustment circuit comprises a micro-computer which includes a sampling signal generator, a level detector and a control circuit, and including an analog to digital converter connected between said tuner and said microcomputer circuit.

* * * * *